United States Patent
Parthasarathy et al.

(10) Patent No.: US 9,478,028 B2
(45) Date of Patent: Oct. 25, 2016

(54) INTELLIGENT LANDMARK SELECTION TO IMPROVE REGISTRATION ACCURACY IN MULTIMODAL IMAGE FUSION

(71) Applicant: KONINKLIJKE PHILIPS N.V., Eindhoven (NL)

(72) Inventors: Vijay Parthasarathy, Tarrytown, NY (US); Muqing Lin, Irvine, CA (US); Jochen Kruecker, Washington, DC (US)

(73) Assignee: Koninklijke Philips N.V., Eindhoven (NL)

( * ) Notice: Subject to any disclaimer, the term of this patent is extended or adjusted under 35 U.S.C. 154(b) by 29 days.

(21) Appl. No.: 14/378,823

(22) PCT Filed: Mar. 1, 2013

(86) PCT No.: PCT/IB2013/051654
§ 371 (c)(1),
(2) Date: Aug. 14, 2014

(87) PCT Pub. No.: WO2013/132402
PCT Pub. Date: Sep. 12, 2013

(65) Prior Publication Data
US 2015/0016728 A1  Jan. 15, 2015

Related U.S. Application Data

(60) Provisional application No. 61/608,215, filed on Mar. 8, 2012.

(51) Int. Cl.
*G06K 9/46* (2006.01)
*G06T 7/00* (2006.01)

(52) U.S. Cl.
CPC ... *G06T 7/0028* (2013.01); *G06T 2207/20101* (2013.01); *G06T 2207/30004* (2013.01); *G06T 2207/30008* (2013.01)

(58) Field of Classification Search
CPC .......... G06T 2207/20101; G06T 2207/30004; G06T 2207/30008; G06T 7/0028
USPC .......................................................... 382/195
See application file for complete search history.

(56) References Cited

U.S. PATENT DOCUMENTS

2005/0031176 A1*  2/2005  Hertel ................... G06T 7/0038
                                                                        382/128
2010/0021082 A1   1/2010  Declerck

FOREIGN PATENT DOCUMENTS

WO    WO2009077938 A1   6/2009
WO    WO2009081318 A1   7/2009

OTHER PUBLICATIONS

Thirion J.P., "Image Matching as a Diffusion Process: An Analogy with Maxwell's Demons", Medical Image Analysis, (1998), vol. 2, No. 3, pp. 243-260.

(Continued)

*Primary Examiner* — Manuchehr Rahmjoo (57) ABSTRACT

Systems and methods for image registration includes an image feature detection module (116) configured to identify internal landmarks of a first image (110). An image registration and transformation module (118) is configured to compute a registration transformation, using a processor, to register a second image (112) with the first image based on surface landmarks to result in a registered image. A landmark identification module (120) is configured to overlay the internal landmarks onto the second image using the registration transformation, encompass each of the overlaid landmarks within a virtual object to identify corresponding landmark pairs in the registered image, and register the second image with the first image using the registered image with the identified landmarks.

9 Claims, 5 Drawing Sheets (56) References Cited

OTHER PUBLICATIONS

Rueckert D. et al., "Non-Rigid Registration of Breast MR Images Using Mutual Information", 1998, Proceedings of the Medical Image Computing and Computer-Assisted Intervention MICCAI'98, Cambridge, MA, pp. 1144-1152.

Ou, Y. et al., "Non-Rigid Registration between Histological and MR Images of teh Prostate: A Joint Segmentation and Registration Framework", IEEE, 2009, pp. 125-132.

Zhan, Y. et al., "Registering Histologic and MR Images and Prostate for Image-based Cancer Detection", Acad Radiol 2007, 14:1367-1381.

Bay, H. et al., "SURF: Speeded Up Robust Features", Computer Vision and Image Understanding, 2008.

\* cited by examiner

INTELLIGENT LANDMARK SELECTION TO IMPROVE REGISTRATION ACCURACY IN MULTIMODAL IMAGE FUSION

CROSS-REFERENCE TO PRIOR APPLICATIONS

This application is the U.S. National Phase application under 35 U.S.C. §371 of International Application Serial No. PCT/IB2013/051654, filed on Mar. 1, 2013, which claims the benefit of U.S. Application Ser. No. 61/608,215, filed on Mar. 8, 2012. These applications are hereby incorporated by reference herein.

This disclosure relates to imaging tools, and more particularly, to systems and methods for multimodal image registration with improved accuracy.

For multimodality image registration, using traditional intensity-based methods are often inappropriate, as different image modalities may present different contrasts and anatomical structures. Instead, feature-based methods are commonly used, which rely on surface landmarks and internal landmarks acquired from segmentation. A key problem in surface-based registration techniques is that it heavily depends on the accuracy of segmentation results. The accuracy of segmentation is often unreliable in imaging modalities having low signal-to-noise ratios, such as ultrasound. Therefore, it is preferable to use both surface landmarks and internal landmarks. Surface landmarks can be easily extracted based on the segmentation of the organ boundary, while internal landmarks may be harder to locate, either manually or automatically. However, due to the differences in the nature of the images, it is difficult to determine landmark pairs between images of different modality. While manual selection for landmark pairs is preferred in many cases, manual selection is subjective and inconsistent.

In accordance with the present principles, novel solutions for selecting landmark pairs in images of different modalities are provided. The selection of landmark pairs includes determining a registration transformation to register a moving image with a static image based on surface landmarks. Internal landmarks identified on the static image are overlaid onto the registered image using the registration transformation. Each overlaid landmark is encompassed within a sphere or other object to help identify corresponding landmark pairs in the registered image. The landmarks identified in the registered image are transformed back to the moving image using the inverse of the registration transformation. The moving image is non-rigidly registered with the static image. Advantageously, the present principles provide guidance to locate corresponding internal landmark pairs. The use of both surface landmarks and internal landmarks in the present principles improves registration accuracy.

A system for image registration includes an image feature detection module configured to identify internal landmarks of a first image. An image registration and transformation module is configured to compute a registration transformation, using a processor, to register a second image with the first image based on surface landmarks to result in a registered image. A landmark identification module is configured to overlay the internal landmarks onto the second image using the registration transformation, encompass each of the overlaid landmarks within a virtual object to identify corresponding landmark pairs in the registered image, and register the second image with the first image using the registered image with the identified landmarks.

A method for image registration includes identifying internal landmarks of a first image. A registration transformation is computed, using a processor, to register a second image with the first image based on surface landmarks to result in a registered image. The internal landmarks are overlaid onto the registered image using the registration transformation. The overlaid landmarks are encompassed within a virtual object to identify corresponding landmark pairs in the registered image. The second image is registered with the first image using the registered image with the identified landmarks.

A method for image registration includes rigidly registering a second image with a first image. Internal features of the first image and the second image are identified, using a processor, to measure the similarity of the first image and the second image to choose one of rigid and non-rigid registration. The second image is registered with the first image using the chosen rigid or non-rigid registration.

This disclosure will present in detail the following description of preferred embodiments with reference to the following figures wherein.

In accordance with the present principles, embodiments for a system, apparatus and method provide intelligent landmark selection to improve registration accuracy in multimodal image fusion. The intelligent landmark selection assists users in selecting consistent landmark pairs between images of different modalities to improve registration accuracy. In one embodiment, intelligent landmark selection includes determining a registration transformation to register a moving image with a static image based on surface landmarks, where the static and moving images are of different modalities. Internal landmarks identified on the static image are overlaid onto the registered image using the registration transformation. Each overlaid landmark is encompassed within a sphere or other object to help identify corresponding landmark pairs in the registered image. The landmarks identified in the registered image are transformed back to the moving image using the inverse of the registration transformation. The moving image is non-rigidly registered with the static image. The use of both surface landmarks and internal landmarks in the present principles improves accuracy.

In another embodiment, the initial registration can be improved by bounding the registration to certain regions of interest. Regions of interest may be prescribed by the user by, e.g., i) manually determining the regions of interest; ii) selecting the regions of interest from a patient specific atlas; and iii) using all landmarks for registration. Manually determining regions of interest may include: i) manually choosing the surface landmarks or specifying the regions of interest; and ii) setting a specific threshold to filter unwanted landmarks. These options are not exclusive to each other as users may use the options in certain combinations to achieve the best result. By bounding the registration to certain regions of interest in the image, better accuracy of registration is achieved in the local regions.

In yet another embodiment, the initial registration can be further improved by optimally choosing between rigid and non-rigid registration. Choosing the optimal registration method includes first rigidly registering the moving image with the static image, and extracting internal features from the images to evaluate the similarity of the images. Internal feature extraction may include applying metrics such as, for example, the distance between anatomical landmark pairs and Dice's similarity co-efficient. Based on the metrics, rigid or non-rigid registration is chosen either manually or automatically. Automatically choosing registration methods includes applying a machine learning engine to predict the performance of non-rigid registration based on the extracted features. Advantageously, optimally choosing either rigid or non-rigid registration provides users with the best quality of image fusion.

The functions of the various elements shown in the FIGS. can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), non-volatile storage, etc.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams and the like represent various processes which may be substantially represented in computer readable storage media and so executed by a computer or processor, whether or not such computer or processor is explicitly shown.

Furthermore, embodiments of the present principles can take the form of a computer program product accessible from a computer-usable or computer-readable storage medium providing program code for use by or in connection with a computer or any instruction execution system. For the purposes of this description, a computer-usable or computer readable storage medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-ray Disc™ (BD).

Figure 1:
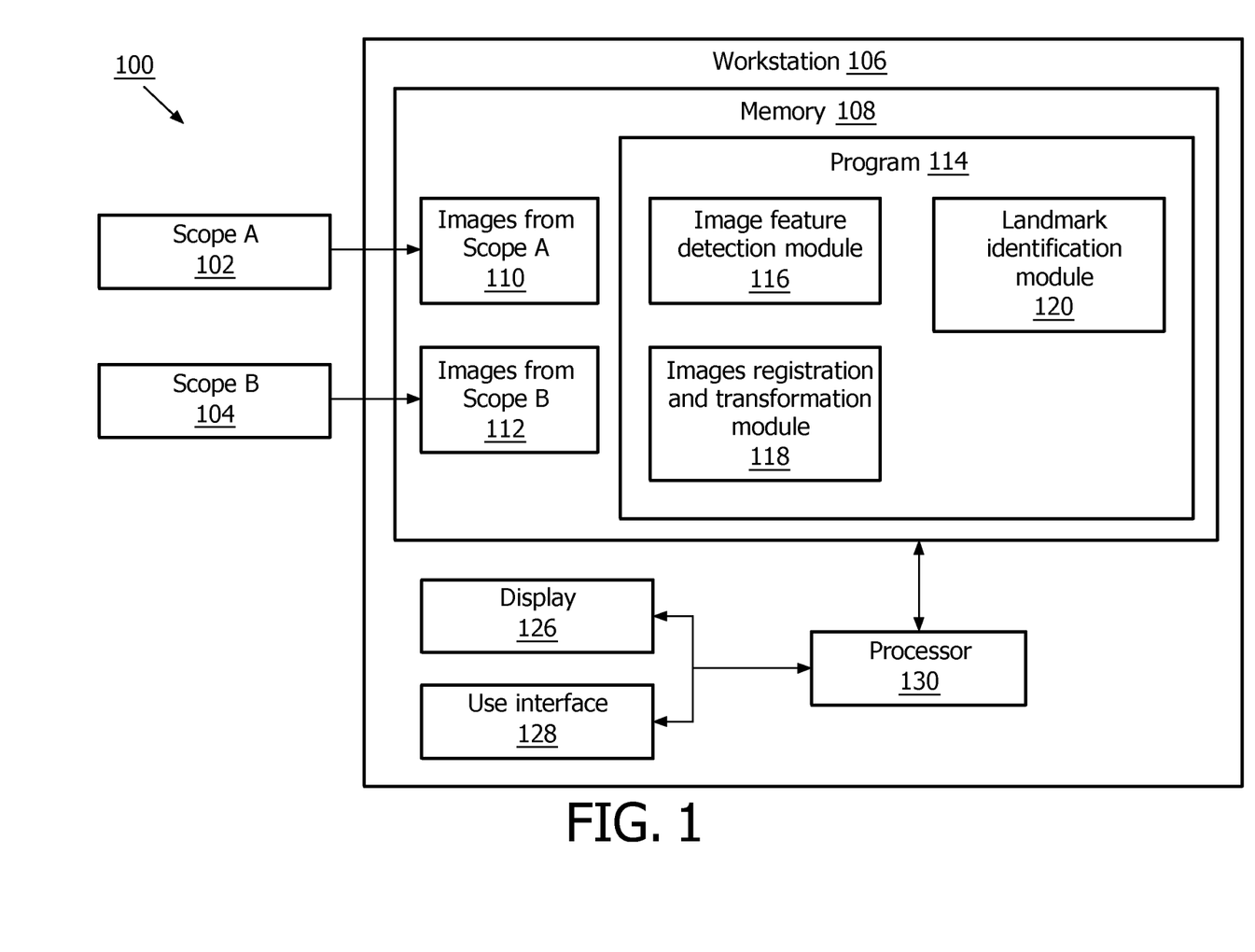
FIG. 1 is a block/flow diagram showing a system for intelligent landmark selection to identify consistent landmark pairs, in accordance with one illustrative embodiment.

Referring now to the drawings in which like numerals represent the same or similar elements and initially to FIG. 1, a system 100 for intelligent landmark selection for assisting users (e.g., a radiologist) to select consistent landmark pairs from images scanned by different modalities to improve registration accuracy is illustratively depicted in accordance with one embodiment. System 100 may include a workstation or console 106 from which registration is supervised and managed. Workstation 106 preferably includes one or more processors 130 and memory 108 for storing programs and applications. It should be understood that the functions and components of system 100 may be integrated into one or more workstations or systems.

Memory 108 may store static image 110 from scope A 102 and moving image 112 from scope B 104. Scopes A 102 and B 104 may include any imaging device, such as, but not limited to, a magnetic resonance imaging (MRI) system, a fluoroscopy system, a computed tomography (CT) system, an ultrasound system, etc. In a preferred embodiment, scopes A 102 and B 104 are of different modalities. The system 100 assists a user in selecting consistent landmark pairs from images 110 and 112 from scopes A 102 and B 104, respectively, to improve registration accuracy.

Workstation 106 may include one or more displays 126 for viewing images 110 and 112. The display 126 may also permit a user to interact with workstation 106 and its components and functions. This is further facilitated by a user interface 128, which may include a keyboard, mouse, joystick, or any other peripheral or control to permit user interaction with workstation 106.

A computer implemented program 114 is stored in memory 108 of workstation 106. The program 114 includes an image feature detection module 116 to detect and identify internal landmarks of static image 110 of the modality of scope A 102. It is noted that internal landmark detection in module 116 may be performed manually or automatically. Manual feature detection in module 116 may employ use of display 126 and user interface 128 to interact with workstation 106. Automatic feature detection in module 116 may employ Scale-Invariant Feature Transform (SIFT) or Speeded Up Robust Feature (SURF) methods to detect features. Other methods are also contemplated.

The program 114 includes an image registration and transformation module 118 to determine a registration transformation to register the moving image 112 of the modality of scope B 104 with the static image 110 of the modality of scope A 102 based on surface landmarks. In one particularly useful embodiment, registration may include bounding the registration to certain regions of interest. By bounding the registration area, accuracy of registration is improved for the local regions. There are several ways in which a user may prescribe the region of interest in accordance with the present principles. For example, the user may: i) manually determine the registration area; ii) select the area from a preset atlas and only the landmarks inside that area will be used for further registration; or iii) use all surface landmarks for registration, which may be the default option in one embodiment. Other methods of prescribing the region of interest are also contemplated. It is noted that these options are not exclusive to each other. The user may use the options in certain combinations to get the best result.

Figure 2:
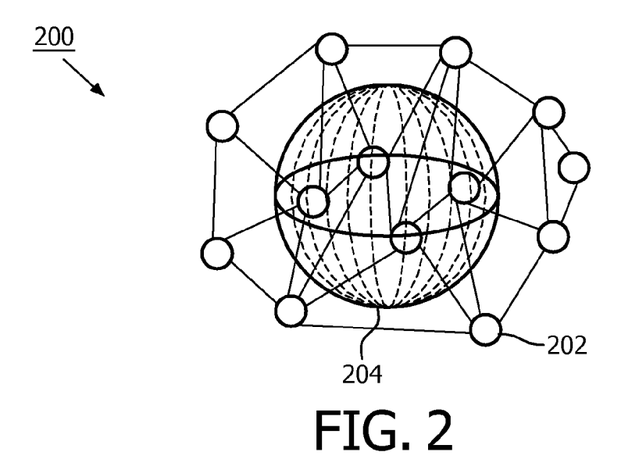
FIG. 2 illustrates a ball-selector system for selecting surface landmarks, in accordance with one illustrative embodiment.

Manual selection of regions of interest for registration may be achieved by manually delineating the surface landmarks or regions of interest. In one embodiment, the user may manually select the surface landmarks in three-dimensional (3D) space using, e.g., a spherical shaped ball-selector, instead of picking the landmarks up one by one. It is to be understood that the present principles are not limited to a spherical shape ball-selector, but rather the selector may be of any shape. Referring for a moment to FIG. 2, a ball-selector system 200 is illustratively depicted. The user can adjust the radius of the ball-selector 202 (e.g., left click+scroll) and all surface landmarks 204 inside the ball selector 202 will be selected (e.g., double left click) or deselected (e.g., double right click).

Figure 3:
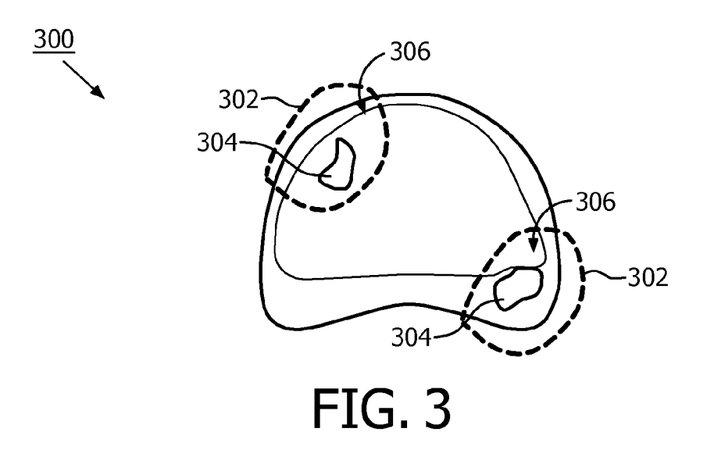
FIG. 3 shows an outline region of interest selection system, in accordance with one illustrative embodiment.

In another embodiment, a user may manually outline regions of interest to delineate anatomical landmarks. Referring for a moment to FIG. 3, an anatomical landmark based on regions of interest selection system 300 is illustratively depicted. The user manually outlines 302 the regions of interest 306 to select landmarks 304 for registration. This may include the use of display 126 and user interface 128. Only the surface landmarks 304 that are within the outlined 302 regions of interest 306 will be used in the registration.

In yet another embodiment, landmarks are selected within a region of interest based on an automatic threshold. For each landmark in the moving image 112, a distance is determined to each landmark in the static image 110 and a shortest distance is determined for each landmark in the moving image 112. The user can then specify a threshold for the shortest distance and all landmarks will be excluded where their shortest distance is larger than the threshold. Such thresholding assumes that the two volumes for registration have already been rigidly aligned and the inconsistent segmentation mainly corresponds to the landmarks with large shortest distances, which is true in the case of, e.g., prostate transrectal ultrasound (TRUS) fusion. Thresholding may also be based on slice range within a volume, such that a user specifies the slice range and excludes the landmarks outside this range.

In accordance with another embodiment, regions of interest can be selected by selecting an area from a patient specific atlas. Generation of a patient specific atlas may include: 1) generating the template segmentation together with the preset atlas by averaging several manual segmentations; 2) deforming the template to match the patient specific segmentation; 3) imposing the deformed template atlas on to the patient specific segmentation; and 4) separate the surface landmarks based on the imposed atlas. The landmarks inside the select area of the preset atlas will be used for further registration.

Referring back to FIG. 1, image registration and transformation module 118 of program 114 registers moving image 112 of the modality of scope B 104 with the static image 110 of the modality of scope A 102. Registration may be either rigid or non-rigid based on the application and the organ of interest. In a particularly useful embodiment, image registration and transformation module 118 includes a decision support for choosing the optimal registration method (e.g., rigid or non-rigid registration). The moving image 112 is rigidly registered with the static image 110 and internal features are extracted to evaluate the similarity of the two images. For multimodal image fusion, both the intensity range and image contrast can be very different. For example, certain landmarks that are visible in an MRI may or may not be visible under ultrasound contrast. As such, it is generally impractical to measure similarity using the traditional methods used in single-modality registration (e.g., the mutual information or squared standard differences methods). Instead, features based on internal anatomical structures are more appropriate.

Feature extraction of the internal features based on the rigidly aligned images can be accomplished either automatically or manually. Internal feature extraction may use two or more metrics to understand the internal warp of the internal features. For example, the following metrics may be applied: 1) distance between anatomical landmark pairs; and 2) Dice's similarity coefficient, which can be computed by $2*|A1 \text{ intersect } A2|/|A1|+|A2|$), where A1 and A2 are two segmented volumes. Other metrics are also contemplated. For example, a metric may take into account internal morphological features and their deformation patterns.

Based on these metrics, one of rigid registration and non-rigid registration can be chosen manually or automatically. Automatic determination may include a machine learning engine to facilitate this decision making process. The machine learning engine first undergoes a training process based on a set of training dataset pairs with a sufficiently diverse set of metrics. For example, machine learning methods such as artificial neural networks or support vector machines may be used to train the machine learning engine to choose between rigid and non-rigid registration. The machine learning engine can be further trained to determine the most optimal set of features and metrics for making the best decision in the same manner. The resulting decision will be a prediction of the performance of non-rigid registration based on the extracted features. In yet another embodiment, where non-rigid registration is recommended, it is evaluated whether whole volume registration is superior to partial registration. In partial registration, only a portion of the image volume will be registered correctly, while the rest may or may not be.

Referring back to FIG. 1, once image registration and transformation module 118 of program 114 registers moving image 112 of the modality of scope B 104 with the static image 110 of the modality of scope A 102, the internal landmarks of image 110 found in the image feature detection module 116 are overlaid onto the registered image of scope B 104 based on the registration transformation computed from the initial registration. The internal landmarks in the modality of scope B 104 may be difficult to locate due to the nature of the imaging modality. Each overlaid landmark on the registered image is encompassed within a virtual object to aid the user in locating landmark pairs. The virtual object may be of user-defined dimensions. In a preferred embodiment, the virtual object is a sphere of a user-defined radius.

Figure 4:
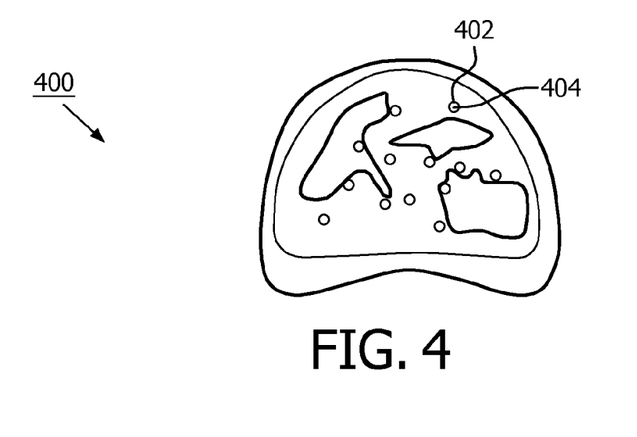
FIG. 4 shows a method for intelligent landmark selection to identify consistent landmark pairs, in accordance with one illustrative embodiment.

Referring now to FIG. 4, a landmark encompassed within a sphere 400 is illustratively depicted in accordance with one embodiment. Each overlaid landmark 404 is encompassed by a sphere 402 of a given radius to aid the user in finding the corresponding landmarks in the modality of scope B 104. Landmark identification module 120 of FIG. 1 may perform landmark identification inside the sphere, which may include manual identification by the user or automatic identification using image analysis algorithms, such as, e.g., SIFT or SURF. The user may specify the radius and decide whether to display all interesting points or just one point. Some of the anatomical structures present in the image 110 of the modality of scope A 102 may not be present in the registered image of the modality of scope B 104. As such, the user may be able to remove landmarks present in such areas.

Image registration and transformation module 118 then transforms the corresponding landmarks in the registered image of the modality of scope B 104 back to the moving image 112 of the modality of scope B 104. This is based on the inverse of the transform of the initial registration. Finally, the image registration and transformation module 118 non-rigidly registers the image 112 of the modality of scope B 104 with the image 110 of the modality of scope A 102 by combining both surface landmarks and the internal landmarks.

As noted above, landmarks in one modality are difficult to locate in another modality. The system 100 for intelligent landmark selection assists users in selecting consistent landmark pairs from images scanned by different modalities. Specifically, the system 100 utilizes both surface landmarks and internal landmarks to improve registration accuracy.

Figure 5:
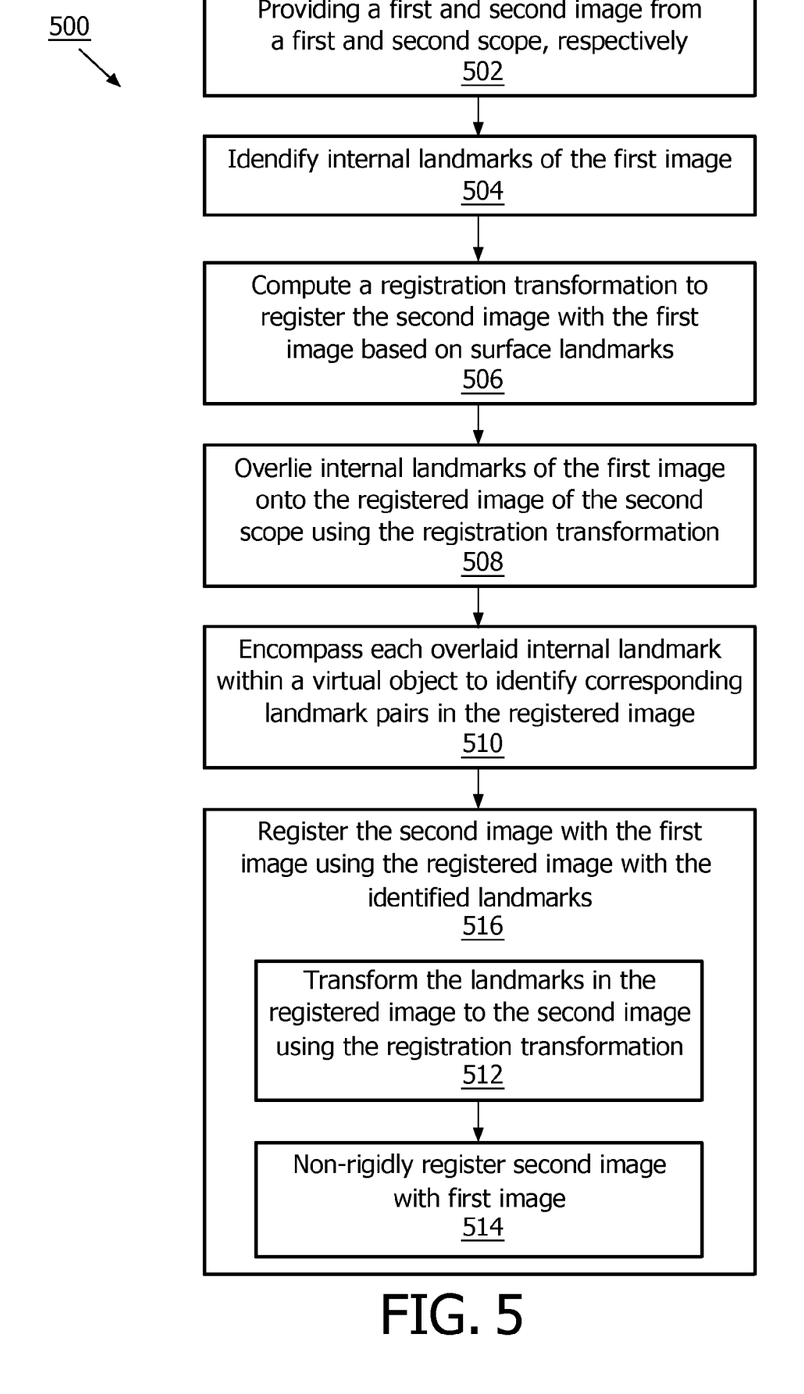
FIG. 5 is a block/flow diagram showing a method for intelligent landmark selection to identify consistent landmark pairs, in accordance with one illustrative embodiment.

Referring now to FIG. 5, a method 500 for intelligent landmark selection to identify consistent landmark pairs is illustratively depicted in accordance with one embodiment. In block 502, first (i.e., static) and second (i.e., moving) images are provided from first and second scopes, respectively. The first and second scopes may include any imaging device, for example, but not limited to, an MRI system, a fluoroscopy system, a CT system, an ultrasound system, etc. In one preferred embodiment, the first and second scopes are of different modalities. The method 500 for intelligent landmark selection assists a user in selecting consistent landmark pairs between the first and second images to improve registration accuracy. In one embodiment, the first image has better resolution and delineation of anatomical structures. Thus, in block 504, internal landmarks of the first image are identified. Identification of internal landmarks may include either manual or automatic identification. Automatic identification of internal landmarks may be accomplished by feature detection methods, such as SIFT or SURF. Other methods of feature detection are also contemplated. In block 506, a registration transformation is determined to register the second image with the first image based on surface landmarks.

Figure 6:
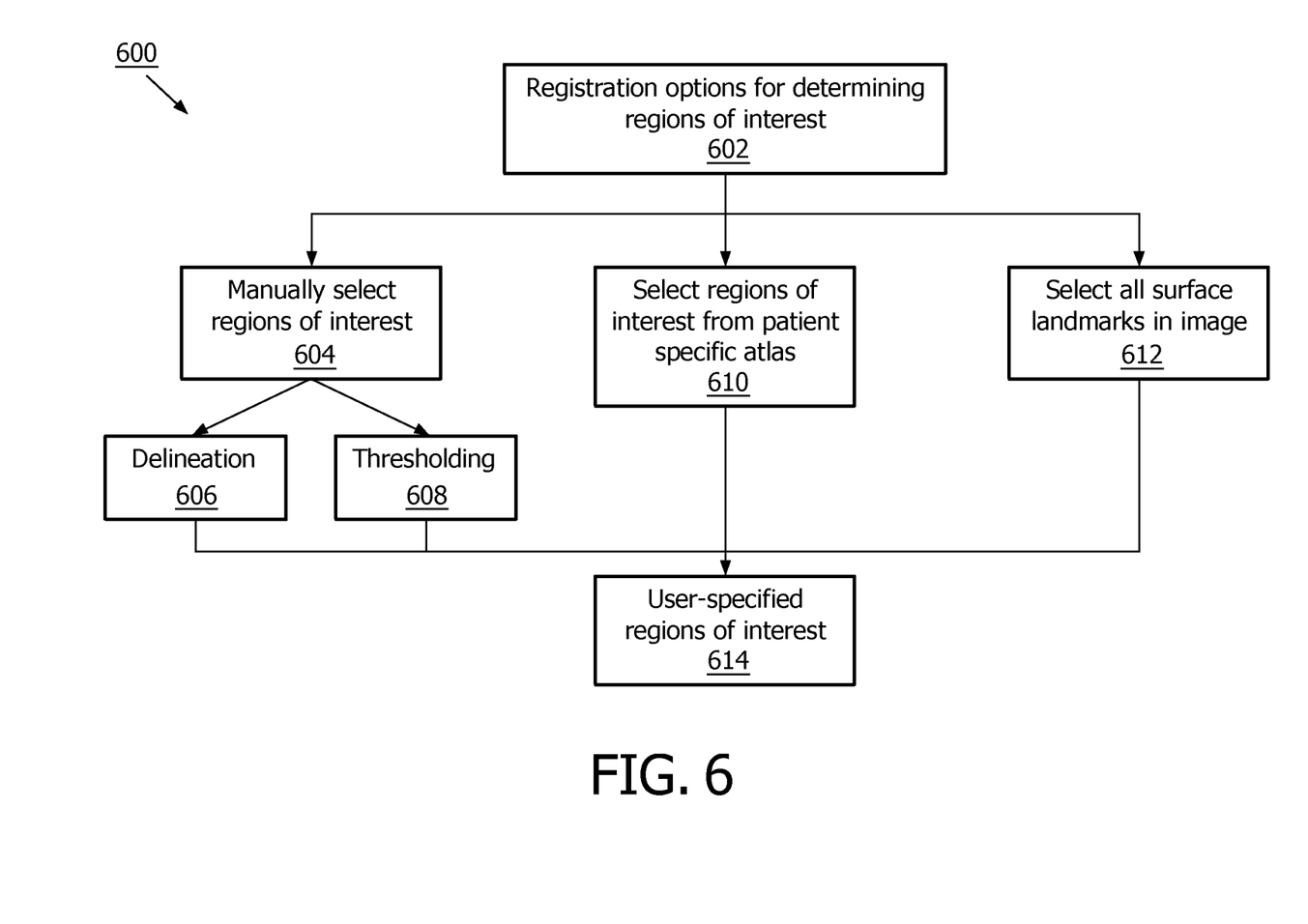
FIG. 6 is a block/flow diagram showing a method for selecting regions of interest for registration, in accordance with one illustrative embodiment.

In one particularly useful embodiment, registration may include bounding the registration area to certain regions of interest. In clinical applications, a user may only be interested in certain local image regions. For example, a focal biopsy could focus only on the posterior region of the prostate based on the diagnosis of a preoperative MRI. In this case, registration accuracy in the anterior area may be irrelevant to the procedure, while the registration accuracy in the posterior area is more relevant. Referring now to FIG. 6, a method 600 for selecting regions of interest for registration is illustratively depicted in accordance with one embodiment. The method 600 bounds registration to certain regions of interest so as to have better accuracy of registration in that local region. In block 602, there are a number of methods to select the region of interest. Registration options for determining regions of interest may include manually selecting the regions of interest in block 604, selecting the regions of interest from a patient specific atlas in block 610, and selecting all surface landmarks in the image in block 612. In one embodiment, selecting all surface landmarks in the image (block 612) is the default option. Other methods of prescribing regions of interest are also contemplated. For example, the user may specify regions of interest by indicting relative anatomical locations, such as anterior or posterior. It is noted that these options are not exclusive to each other. The user may use the options in certain combinations to achieve the desired results.

In block 606, manual selection of the regions of interest may include delineation. In one embodiment, delineation is performed using a spherical ball-selector to select surface landmarks in 3D space. It is noted that the ball-selector is not limited to a spherical shape, but may be any shape. The user may be able to adjust the radius of the ball-selector, and indicate whether all surface landmarks within the ball will be selected or deselected. The user may also have the option for an inverse selection of the surface landmarks within the ball-selector. In another embodiment, delineation is performed by a user by outlining the regions of interest. For example, a user may manually outline critical lesions and vessels for registration. In block 608, manual selection of the regions of interest may also include thresholding. Thresholding may include selecting landmarks for registration through the filtering of landmarks based on a user-specified threshold value. The shortest distance from each landmark in the moving image to each landmark in the static image is first determined. Landmarks with their shortest distance larger than the user specified threshold will be excluded during registration. It is noted that thresholding assumes that the two images for registration have already been rigidly aligned and the inconsistent segmentation mainly corresponds to the landmarks with the large shortest distance. Other methods of threshold are also contemplated. For instance, a user can also specify a slice range and exclude landmarks outside this range.

In block 610, a user may select regions of interest for registration by selecting the regions of interest from a patient specific atlas. Generating a patient specific atlas may include: 1) generating the template segmentation together with the preset atlas by averaging several manual segmentations; 2) deform the template to match the patient specific segmentation; 3) impose the deformed template atlas on to the patient specific segmentation; and 4) separate the surface landmarks based on the imposed atlas.

Advantageously, the method 600 provides for selecting regions of interest for registration, such that better accuracy of registration is achieved in the local regions.

Figure 7:
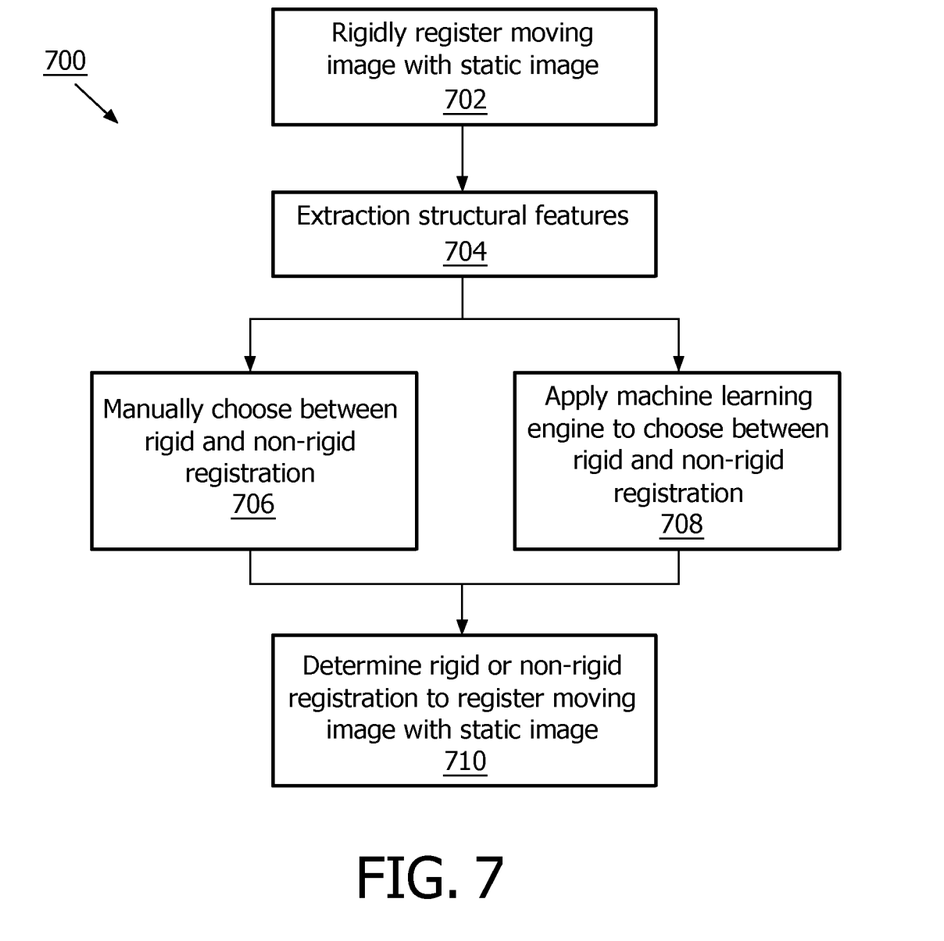
FIG. 7 is a block/flow diagram showing a method for choosing an optimal registration method, in accordance with one illustrative embodiment.

Referring back to block 506 of FIG. 5, the second image is registered with the first image based on surface landmarks. The registration may be rigid or non-rigid based on the application and the organ of interest. In one particularly useful embodiment, registration includes a method for deciding between rigid and non-rigid registration based on extracted image features and their deformation patterns. Referring now to FIG. 7, a method 700 for choosing the optimal registration method is illustratively depicted in accordance with one embodiment. In block 702, the moving image is first rigidly registered with the static image. It is noted that correct rigid registration is assumed in this method. For multimodal image fusion, both the intensity range and image contrast may be very different. Therefore, it is typically impractical to measure similarity using tradition methods used in single-modality registration (e.g., mutual information and squared standard difference). Instead, similarity measures based on internal anatomical structures are more appropriate. In block 704, internal structural features are extracted to evaluate the similarity of the two images. Feature extraction may include computing metrics to help understand the internal warp of the internal features. For example, the following metrics may be applied, in accordance with one embodiment: 1) distance between anatomical landmark pairs; and 2) Dice's similarity coefficient. Other metrics are also contemplated. For instance, internal morphological features and their deformation patterns may be used.

Using the metrics, the method 700 chooses between rigid and non-rigid registration. In one embodiment, in block 706, metrics can be used to manually choose registration methods. In another embodiment, in block 708, a machine learning engine is applied to automatically choose registration methods. Based on a set of training dataset pairs with sufficiently diverse set of metrics, machine learning methods, such as, e.g., artificial neural networks or support vector machines can be trained to choose between rigid and non-rigid registration. The machine learning engine can further be trained to decide on the optimal set of features and metrics for making the best decision. The machine learning engine may predict the performance of rigid and non-rigid registration based on the extracted features in block 710. In one embodiment, if non-rigid registration is chosen, the machine learning engine evaluates whether whole volume registration is superior to partial registration.

The method 700 for choosing the optimal registration method provides users the best quality of image fusion by choosing the optimal registration metric for each specific image data.

Landmarks of the second image (of the modality of the second scope) may be difficult to locate due to the nature of the imaging modality. As such, referring back to block 508 of FIG. 5, the internal landmarks of the first image are overlaid onto the registered image of the second scope based on the registration transformation calculated in the initial registration (block 506). In block 510, each overlaid internal landmark on the registered image is encompassed within a virtual object to guide the user to find the corresponding landmark pairs. The virtual object highlights the overlaid landmarks to aid a user in identifying the corresponding landmark pair. The virtual object may be of user-defined dimensions. In a preferred embodiment, the virtual object is a sphere. The user may specify the radius of the sphere and decide whether to display all overlaid points or not. Features in the first image may not be present in the registered image. The user may be able to remove landmarks present in such areas. Identifying internal landmarks within the virtual object may be performed manually or automatically. Automatic identification of landmarks may include applying image analysis methods, such as, e.g., SIFT or SURF, however other methods are also contemplated.

In block 516, the second image is registered with the first image using the registered image with the identified landmarks. Block 516 includes blocks 512 and 514. In block 512, the corresponding landmarks in the registered image will be transformed back to the second (i.e., moving) image based on the inverse of the registration transformation calculated from the initial registration (block 506). In block 514, the second (i.e., moving) image is non-rigidly registered with the first image by combining both surface landmarks and internal landmarks. The combination of surface and internal landmarks has been shown to improve registration accuracy.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) no specific sequence of acts is intended to be required unless specifically indicated.

Having described preferred embodiments for intelligent landmark selection to improve registration accuracy in multimodal image fusion (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the embodiments disclosed herein as outlined by the appended claims. Having thus described the details and particularity required by the patent laws, what is claimed and desired protected by Letters Patent is set forth in the appended claims.

The invention claimed is:

1. A system for image registration, comprising:

an image feature detection module configured to identify internal landmarks of a first image;

an image registration and transformation module configured to compute a registration transformation, using a processor, to register a second image with the first image based on surface landmarks to result in a registered image; and a landmark identification module configured to overlay the internal landmarks onto the second image using the registration transformation, encompass the overlaid landmarks within a virtual object to identify corresponding landmark pairs in the registered image, and register the second image with the first image using the registered image with the identified landmarks;

wherein the landmark identification module is further configured to register the second image with the first image using the registered image with the identified landmarks by transforming the identified landmarks in the registered image to the second image using the registration transformation; and wherein the landmark identification module is further configured to register the second image with the first image using the registered image with the identified landmarks by non-rigidly registering the second image with the first image.

2. The system as recited in claim 1, wherein the landmark identification module is further configured to use the inverse of the registration transformation.

3. The system as recited in claim 1, wherein the landmark identification module is further configured to register the second image with the first image using surface landmarks and internal landmarks.

4. The system as recited in claim 3, wherein the virtual object includes user-defined dimensions.

5. The system as recited in claim 1, wherein the virtual object includes a sphere.

6. The system as recited in claim 1, wherein the first image and the second image are of different modalities.

7. A method for image registration, comprising:

identifying internal landmarks of a first image;

computing, using a processor, a registration transformation to register a second image with the first image based on surface landmarks to result in a registered image;

overlying the internal landmarks onto the registered image using the registration transformation, encompassing the overlaid landmarks within a virtual object to identify corresponding landmark pairs in the registered image;

registering the second image with the first image using the registered image with the identified landmarks;

wherein registering the second image with the first image using the registered image with the identified landmarks includes transforming the identified landmarks in the registered image to the second image using the registration transformation; and wherein registering the second image with the first image using the registered image with the identified landmarks includes non-rigidly registering the second image with the first image.

8. The method as recited in claim 7, wherein non-rigidly registering the second image with the first image includes using surface landmarks and internal landmarks.

9. The method as recited in claim 7, wherein encompassing the overlaid landmarks within a virtual object includes encompassing the overlaid landmarks within a sphere.

* * * * *